United States Patent [19]
Sawano et al.

[11] Patent Number: 5,515,752
[45] Date of Patent: May 14, 1996

[54] APPARATUS FOR TIGHTENING LOOSENING A SCREW MEMBER FOR FASTENING A FORM

[75] Inventors: Takayasu Sawano, Shimizu; Kazuo Nakada, Fujieda, both of Japan

[73] Assignee: Kabushiki Kaisha Toyoda Kihan, Shizuoka, Japan

[21] Appl. No.: 313,344

[22] Filed: Sep. 27, 1994

[30] Foreign Application Priority Data

Dec. 27, 1993 [JP] Japan ................................ 5-346847

[51] Int. Cl.⁶ .................................................. B25B 29/00
[52] U.S. Cl. ........................................... 81/57.4; 81/57.36
[58] Field of Search .......................... 81/54, 57.36, 57.4

[56] References Cited

U.S. PATENT DOCUMENTS 5,245,895  9/1993  Yoshida et al. ............................ 81/57.4

FOREIGN PATENT DOCUMENTS 59-49169  1/1984  Japan.
387206  4/1991  Japan.

*Primary Examiner*—James G. Smith
*Attorney, Agent, or Firm*—Webb Ziesenheim Bruening Logsdon Orkin & Hanson

[57] ABSTRACT

A tightening/loosening apparatus comprises a displacing mechanism (170) for forcibly displacing a wrench (74) from a screw member (18) with the movement of a processing mechanism (42) due to a movement of the wrench for rotating the screw member, while engaged with each other, to the vicinity of a predetermined position.

10 Claims, 9 Drawing Sheets

APPARATUS FOR TIGHTENING LOOSENING A SCREW MEMBER FOR FASTENING A FORM

BACKGROUND OF THE INVENTION

1. Field of the Invention

This invention relates to an apparatus for tightening or loosening a screw member to be used for fastening a form for molding concrete secondary products.

2. Description of the Prior Art

As a centrifugal-type molding form for concrete secondary products, as described in the Official Gazette of Japanese Patent Appln. Publication No. 59-49169, there are used a pair of halved bodies, each having a semi-circular sectional shape with a flange at each of facing side portions. Both the halved bodies are fastened with a screw member consisting of a bolt, a nut or the like disposed at each of a plurality of portions on the flange.

One of tightening/loosening apparatuses used for a screw member to assemble or disassemble such a form is described in the above-mentioned Official Gazette. In the known tightening/loosening apparatus, while a form disposing the screw members thereon is continuously moved in one direction and while a plurality of tightening and loosening mechanisms, i.e., processing mechanisms are moved together with the form, each screw member is rotated by means of a wrench of each processing mechanism. The processing mechanisms are advanced one after another with the movement of the form, and are returned to their initial positions after tightening or loosening the screw members. Incidentally, the direction of the movement of the form is defined as the forward and backward direction, and the horizontal direction to cross approximately at right angles a passage for the form is defined as the lateral direction.

While the corresponding processing mechanism is moved together with the form, each wrench is moved by a moving mechanism toward the screw member of the form to be engaged therewith, and the screw member is tightened or loosened by the wrench. Thereafter, each wrench is moved to be away from the screw member by the moving mechanism to be disengaged from the screw member.

In the known tightening/loosening apparatus, however, when the wrench becomes unmovable relative to the screw member while engaged with the screw member due to some trouble in the moving mechanism or the like, even if the processing mechanisms have been moved to predetermined positions for disengaging the wrench from the screw member, the wrench is farther moved with the form in the moving direction of the form without being released or disengaged from the screw member. As a result, the screw member, form, wrench, wrench moving means or the like are broken and scattered, which causes dangers.

SUMMARY OF THE INVENTION

An object of the present invention is to enable the wrench to be surely released from the screw member even when the moving mechanism or the like goes out of order.

The tightening/loosening apparatus of the present invention comprises: at least one processing mechanism provided with a wrench releasably engaged with a screw member disposed on the form and for rotating said screw member about its axis, the processing mechanism being moved with the movement of the form from a first position rear in the moving direction of the form to a second position ahead in the moving direction of the form; a moving mechanism for moving the wrench to engage it with the screw member and for moving the wrench to disengage the wrench from the screw member, by the time when the processing mechanism is moved from the first position to the second position; and a displacing mechanism for forcibly displacing the wrench in a direction to disengage it from the screw member with the movement of the processing mechanism when the wrench is moved to the vicinity of the second position while the wrench is engaged with the screw member.

The wrench is moved toward the screw member of the form by the moving mechanism and engaged with the screw member. Then, the screw member is rotated by the wrench to be tightened or loosened. Thereafter the wrench is moved by the moving mechanism in a direction to be away from the screw member and disengaged therefrom. Such operations are performed while the processing mechanism is advanced from the first position to the second position by the movement of the form.

The wrench of the processing mechanism is usually disengaged from the screw member by the moving mechanism by the time the processing mechanism reaches the vicinity of the second position. However, if the wrench is engaged with the screw member, even though the processing mechanism has been moved to the vicinity of the second position, the wrench is forcibly displaced by the displacing mechanism in a direction to be away from the screw member with the movement of the processing mechanism.

Consequently, according to the present invention, it is safe even if the moving mechanism or the like goes out of order, because the wrench is surely disengaged from the screw member at a predetermined position.

It is preferable that the apparatus further comprises: a support means for supporting the processing mechanism movably in the moving direction of the form; and an engaging mechanism disposed on the processing mechanism, for releasably engaging with the form and, in a state of engagement with the form, for advancing the processing mechanism upon receipt of a moving force from the form together with the form. By so doing, the processing mechanism is made to determine its position relative to the screw member while advancing with the movement of the form, and in that state it makes the wrench rotate the screw member, facilitating the positioning of the wrench and the screw member.

The displacing mechanism can be provided with: a first cam member disposed on the support means at a position corresponding to the second position in the moving direction of the form; and a second cam member disposed on the processing mechanism so as to contact the first cam member when the processing mechanism is moved to the vicinity of the second position, thereby displacing the wrench in a direction to be away from the screw member.

The processing mechanism can be further provided with: a first movable body disposed on the support means so as to move in the moving direction of the form; and a second moving body disposed on the first movable body so as to move in the vertical direction and for supporting the wrench. In this case, the second movable body is moved vertically by the moving mechanism for engaging and disengaging the wrench with and from the screw member, and the second cam member is disposed on the second movable body.

It is preferable that a plurality of the processing mechanisms be disposed one after another so as to move reciprocally between the first position and the second position with the movement of the form, and that the moving mechanism and the displacing mechanism be provided at each processing mechanism. By this, since a plurality of processing mechanisms can be reciprocally moved for tightening or loosening the screw member, a vast space to install them can be dispensed with, and there is no fear of a lead for electric power or a hose for compressed air used as the motive power of the processing mechanism being twisted. Therefore, the apparatus can be miniaturized and simplified.

It is preferable that the wrench have a pneumatic motor as its source of rotation, the pneumatic motor being rotated by pressure air, and that the processing mechanism further include a nozzle portion for ejecting a part of the air exhausted from the pneumatic motor toward the passage for the screw member. By this, since the pressure air to drive the pneumatic motor generally contains a very small quantity of oily ingredients to protect the motor, and also since the oily ingredients remain in the air exhausted from the pneumatic motor, a part of the air exhausted from the pneumatic motor is sprayed on the screw member to lubricate the screw member spontaneously. So, there is no need to make lubricant ready, and the cost can be cheap.

It is also preferable that the processing mechanism further include: a first movable body disposed on a support means so as to move in the moving direction of the form; a second movable body disposed on the first movable body so as to move in the vertical direction; and connecting means for connecting the wrench with the second movable body so as to displace elastically in the horizontal direction crossing the moving direction of the form. By this, even if the mutual positional relation between the screw member and the wrench in the horizontal direction crossing the moving direction of the form is inaccurate, the wrench engages with the screw member.

In a preferable embodiment, the connecting means can be provided with: a first connector disposed on one of the second movable body and the wrench, the first connector having a vertical through hole; a second connector disposed on the other of the second movable body and the wrench and received by the first connector so as to be displaced in the horizontal direction crossing the moving direction of the form; a coupling pin attached to the second connector and received by the hole; and an elastic body allowing the coupling pin to elastically displace relative to the hole in the horizontal direction crossing the moving direction of the form.

It is preferable that the wrench include: a rotary mechanism; a rotor releasably engaged with the screw member and supported and rotated by the rotary mechanism, the rotor rotating the screw member about its axis; and a spring for applying a force to the rotor to displace it downward. By this, even if an amount of the vertical movement of the wrench by the moving mechanism does not coincide with that of the vertical movement of the screw member due to screwing, the difference between both the amounts of the movements is compensated by the spring. Consequently, there is no fear of the wrench and the screw member being disengaged with changes in the screwed state of the screw member.

It is preferable that the screw member include a polygonal columnar portion; an end portion which has a shape like a polygonal pyramid or truncated pyramid corresponding to the columnar portion, and which is integral with the columnar portion, tapering off with the distance from the columnar portion; and that the wrench include a recess having a sectional shape of a polygon corresponding to the columnar portion of the screw member. By this, even if the positions of the wrench and the screw member around the axis of rotation of the wrench and the axis of the screw member do not coincide, the wrench and the screw member surely engage with each other in a short time.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF PREFERRED EMBODIMENTS

Figure 1:
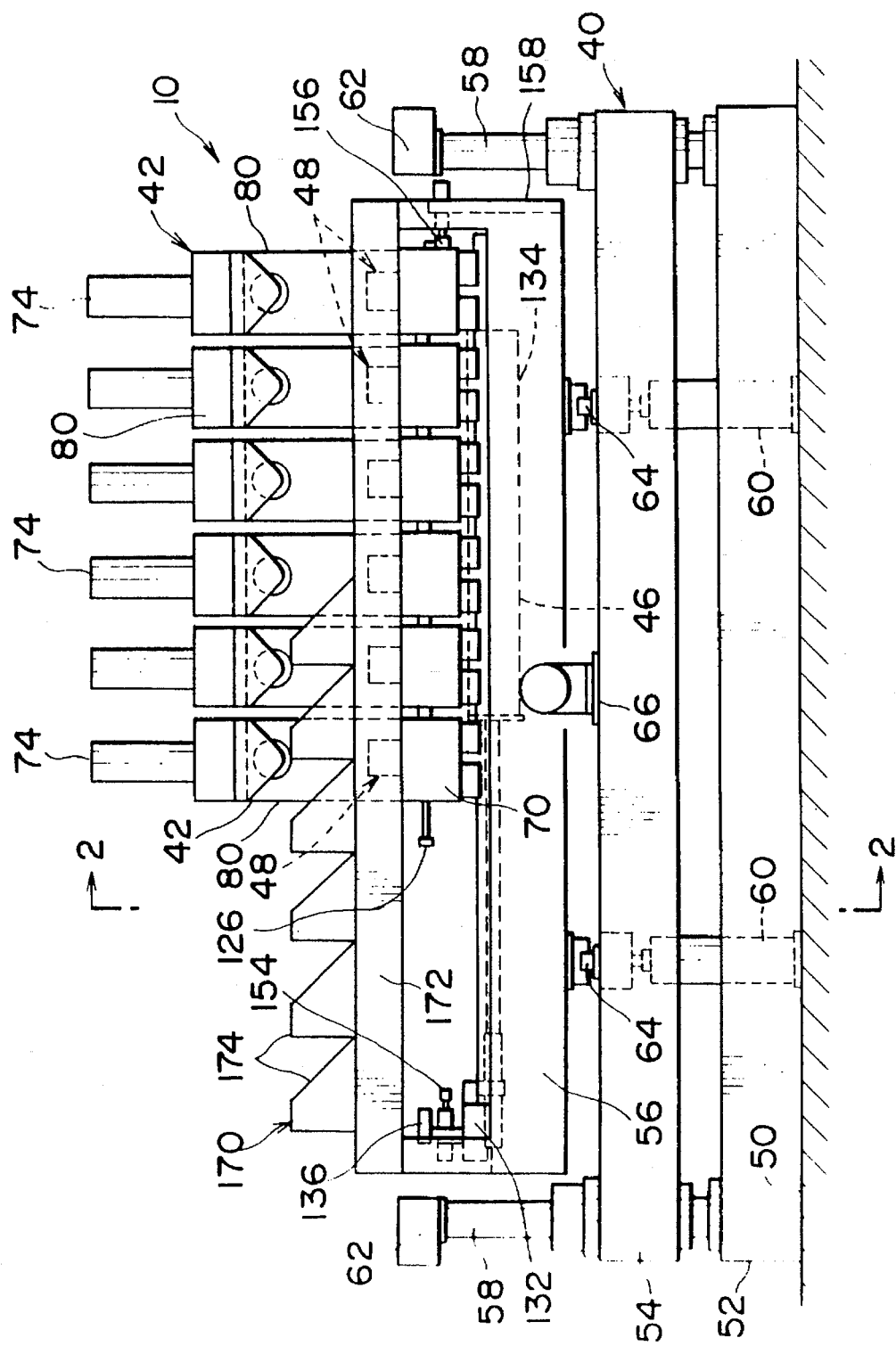
FIG. 1 is a view showing one embodiment of a tightening/loosening apparatus.
Figure 2:
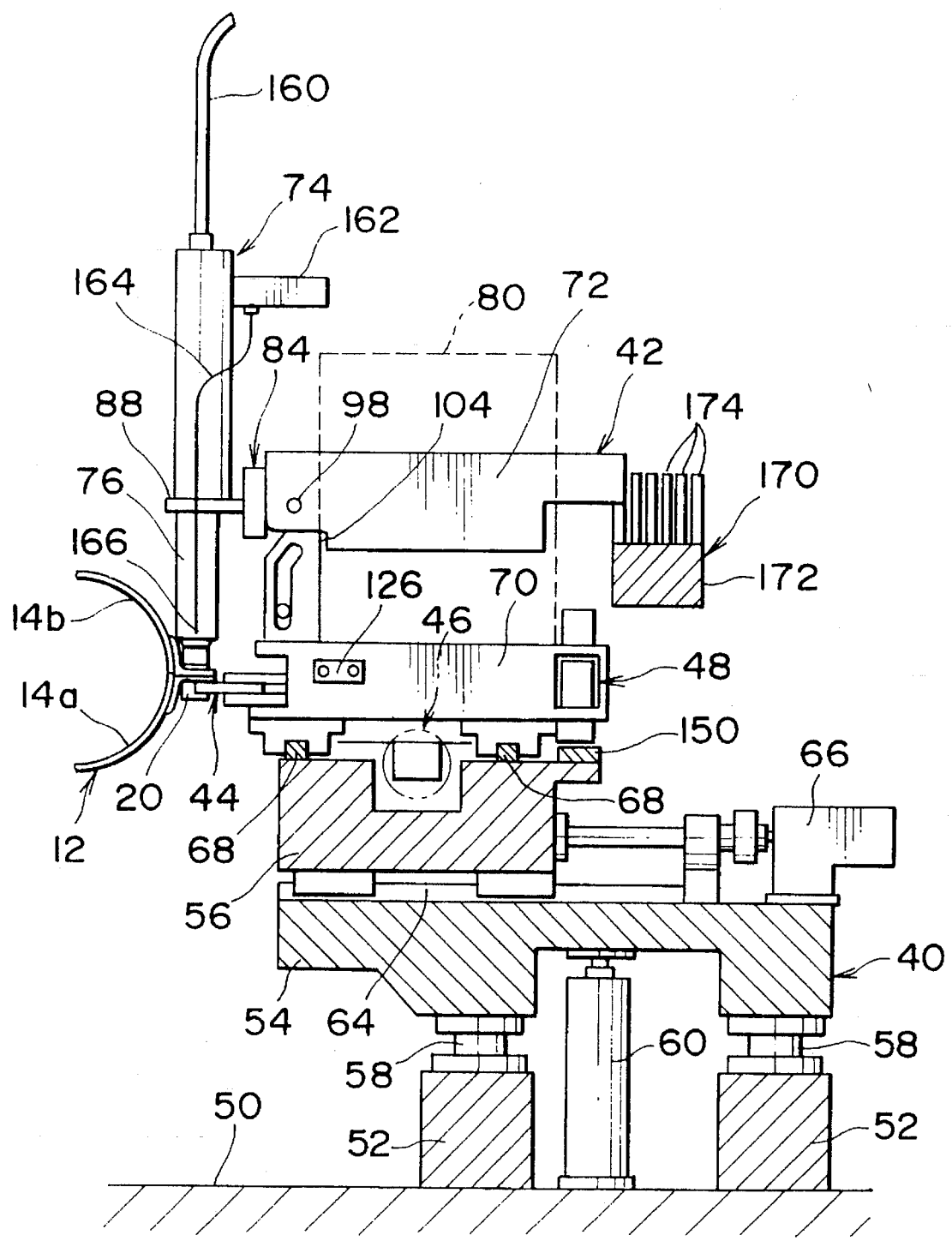
FIG. 2 is a sectional view taken along line 2—2 in FIG. 1 in which some members of the processing mechanism are omitted.
Figure 3:
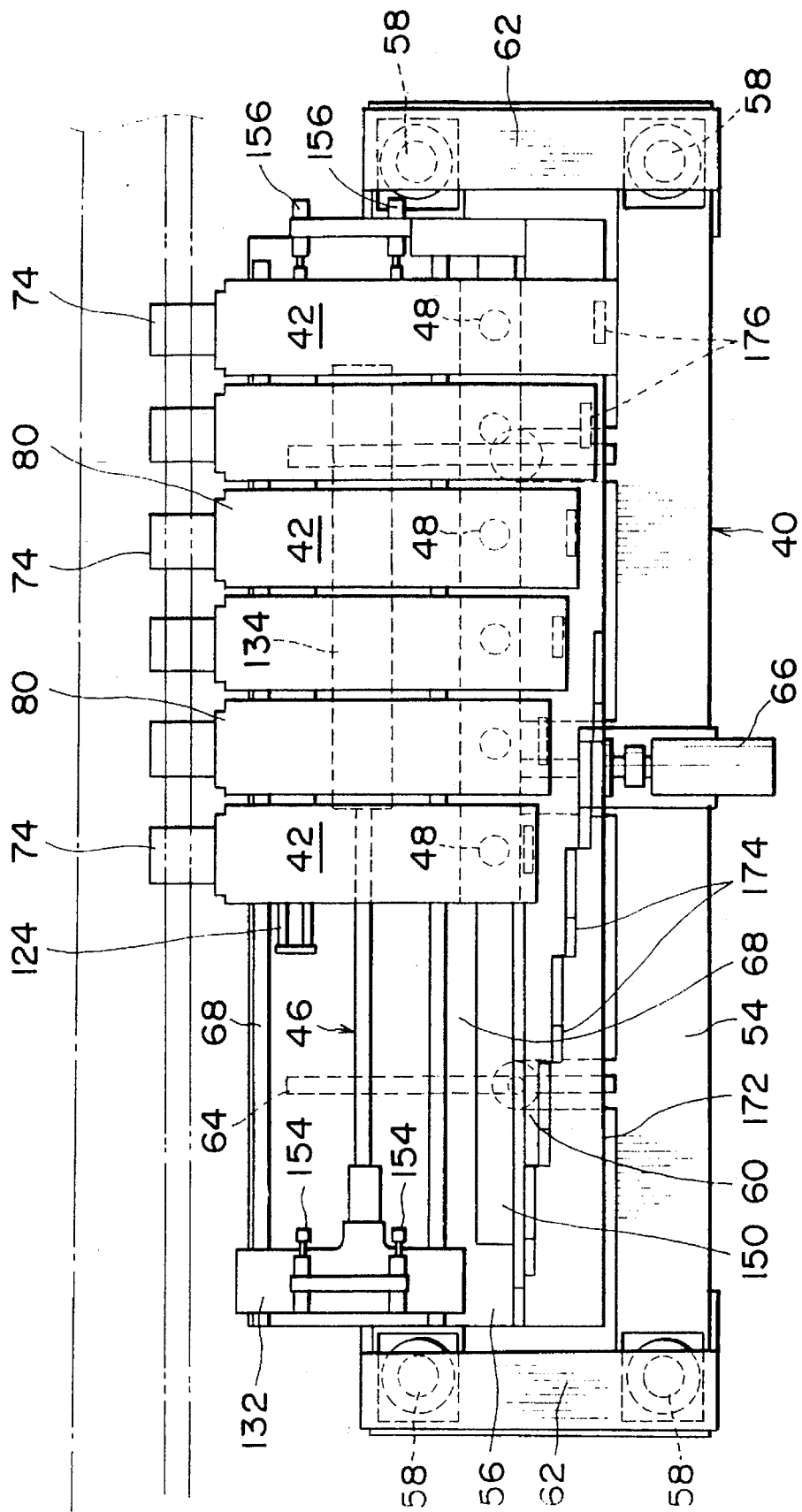
FIG. 3 is a plan view of the tightening/loosening apparatus shown in FIG. 1.

Referring to FIGS. 1–3, a tightening/loosening apparatus 10 is used as an apparatus for fastening or releasing a plurality of screw members disposed in a flange in one of the side portions of a form 12.

The form 12 consists of a pair of a semicircular halved bodies 14a, 14b, each having a shape of a semicircular section and a flange extending in the longitudinal direction of the form at one side edge portion or each of both side edge portions. The form 12 is moved from right to left continuously in FIGS. 1 and 3 by transfer means not shown in a state of the flanges being overlapped one on the other and made horizontal.

Figure 9:
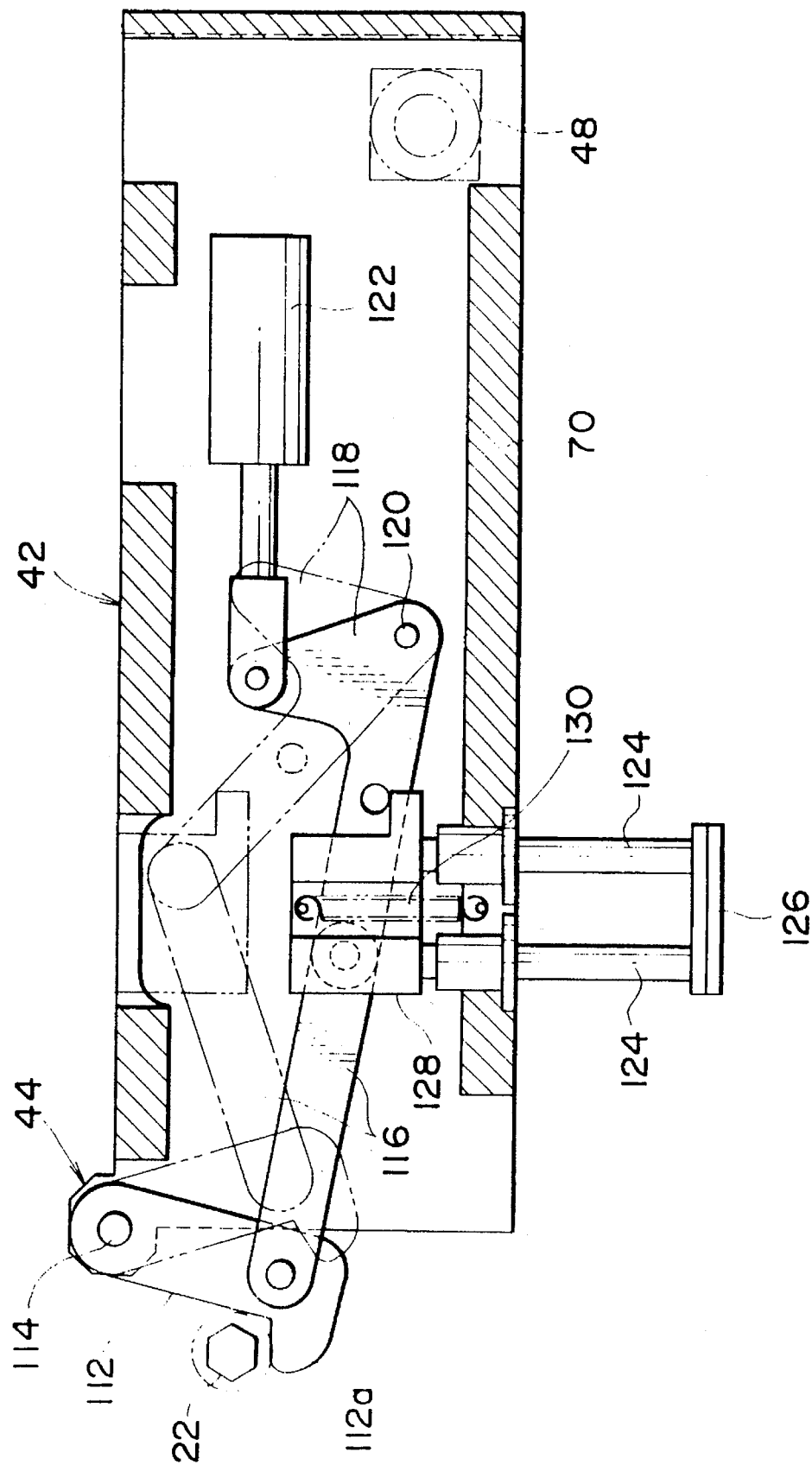
FIG. 9 is a view showing one embodiment of the engaging mechanism.

In case the form 12 is like, for example, the form described in FIG. 9 of Japanese Patent Appln. Publication No. 59-49169 wherein each halved body has a flange only at one side edge portion thereof and wherein both halved bodies are hinged at the other side edge portion to be connected with each other, it suffices to dispose one tightening/loosening apparatus in the vicinity of the passage for the form 12.

However, in case the form 12 is like, for example, the form described in FIG. 1 of Japanese Patent Appln. Publication No. 59-49169, wherein each halved body has a flange at each of both side edge portions thereof and wherein both halved bodies are fastened at respective flanges by screw members, it is preferable to dispose a pair of tightening/loosening apparatuses opposite to the passage for the form 12 and to simultaneously carry out tightening or loosening operations of the screw members by both the tightening/loosening apparatuses.

Figure 4:
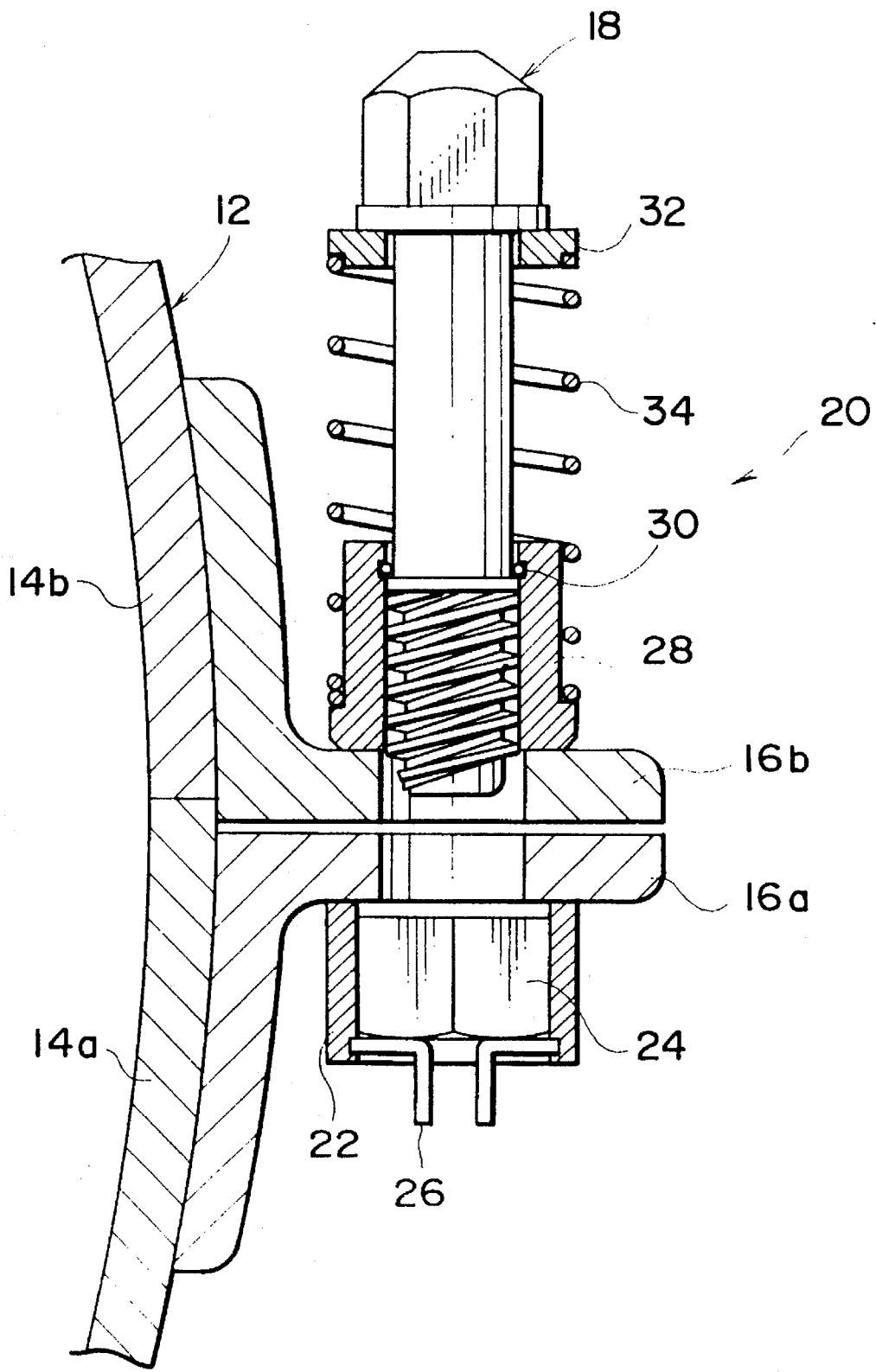
FIG. 4 is a sectional view showing one embodiment of the apparatus for tightening the form.

The form 12 is assembled, as shown in FIG. 4 with a part enlarged, to be cylindrical by fastening both halved bodies 14a, 14b with the screw members 18 at several portions of the flanges 16a, 16b and to be disassembled into a pair of halved bodies 14a, 14b by loosening the screw members 18.

In the embodiment shown in FIG. 4, each screw member 18 is the bolt of the known fastening apparatus 20 described in Japanese Utility Model Public Disclosure No. 3-87206 (KOKAI), etc., and the flanges 16a and 16b are respectively secured to the corresponding halved bodies 14a and 14b. The screw member 18, however, may be another member such as a nut or the like. The head portion of the screw member 18 has a shape of hexagonal column, and the upper end of the head portion is shaped like a truncated cone.

Referring to FIG. 4, the fastening apparatus 20 is provided with: a cylindrical holding member 22 secured to the lower face of the lower flange 16a coaxially with a hole formed in the lower flange 16a; a nut 24 to be disposed irrotatably within the holding member 22 and screwed on the screw member 18; a stopper 26 disposed within the holding member 22 so as to prevent the nut 24 from dropping out of the holding member 22; a cylindrical holding member 28 secured to the upper face of the upper flange 16b coaxially with a hole formed in the upper flange 16b and for receiving the screw member 18; a stop ring 30 disposed within the holding member 28 so as to prevent the screw member 18 from dropping out of the holding member 28; an annular spring receiver 32 disposed between the head portion of the screw member 18 and the holding member 28; and a spring 34 disposed between the holding member 28 and the spring receiver 32.

Referring again to FIGS. 1 through 3, the tightening/loosening apparatus 10 includes: a support means 40 disposed beside the passage for the form 12; a plurality of tightening/loosening mechanisms or processing mechanisms 42 (six in the Figures) respectively disposed on the support means 40 so as to move reciprocally between the first position rear in the moving direction of the form 12 and the second position ahead of the first position, each mechanism 42 rotating the screw member 18; an engaging mechanism 44 disposed on each processing mechanism 42 so as to be releasably engaged with the form 12 to advance the corresponding processing mechanisms 42 with the movement of the form 12; a returning mechanism 46 for returning the processing mechanisms 42 from the side of the second position to the side of the first position simultaneously; and a braking mechanism 48 disposed on each processing mechanism 42 so as to generate a braking force upon termination of the movement of the processing mechanisms 42.

The support means 40 is provided with: a pair of long bases 52 installed on a floor 50 so as to be parallel to the passage for the form 12; a first long movable bed 54 disposed on both bases 52 to be movable in the vertical direction; a second movable bed 56 disposed on the first movable bed 54 to be movable in the lateral direction (the right and left direction in FIG. 2) so as to horizontally cross the passage for the form 12.

The first movable bed 54 is hindered from moving in the forward and backward and lateral directions by a plurality of rods 58, each extending upward through each end portion of the first movable bed 54 from each end portion of each base 52. The position of the first movable bed 54 in the vertical direction can be adjusted by a plurality of jacks 60 using an oil hydraulic or pneumatic pressure cylinder mechanism or the like, and thereby the height position of the processing mechanism 42 relative to the form 12 can be adjusted. The rods 5B adjacent to each other in the lateral direction are connected at their upper end portions by connecting members 62.

The second movable bed 56 is slidably engaged, so as to be prevented from moving in the vertical direction and the forward and backward direction, with a plurality of rails 64 provided at the upper face of the first movable bed 54 so as to extend in the lateral directions. The position of the second movable bed 56 in the lateral direction can be adjusted by a drive mechanism 66 disposed sn the first moving bed 54, so that the position of the processing mechanism 42 in the lateral direction relative to the form 12 can be adjusted. The drive mechanism 66 is a screw jack provided with a source of rotation such as an electric motor, pneumatic motor or the like, in the illustrated embodiment.

The second movable bed 56 is provided on its upper face with a pair of guide rails 68 for regulating the movement of the processing mechanism 42 relative to the second movable bed 56. The guide rails 68 extend in the forward and backward directions to be parallel to each other at positions spaced apart in the lateral direction of the upper face of the second movable bed 56. The processing mechanisms 42 are disposed in order in the direction of the guide rails 68 so as to move one after another in the same direction along the guide rails 68. For this reason, areas for the movement of the processing mechanisms adjacent in the forward and backward direction mostly overlap but are somewhat displaced in the forward and backward direction.

Figure 5:
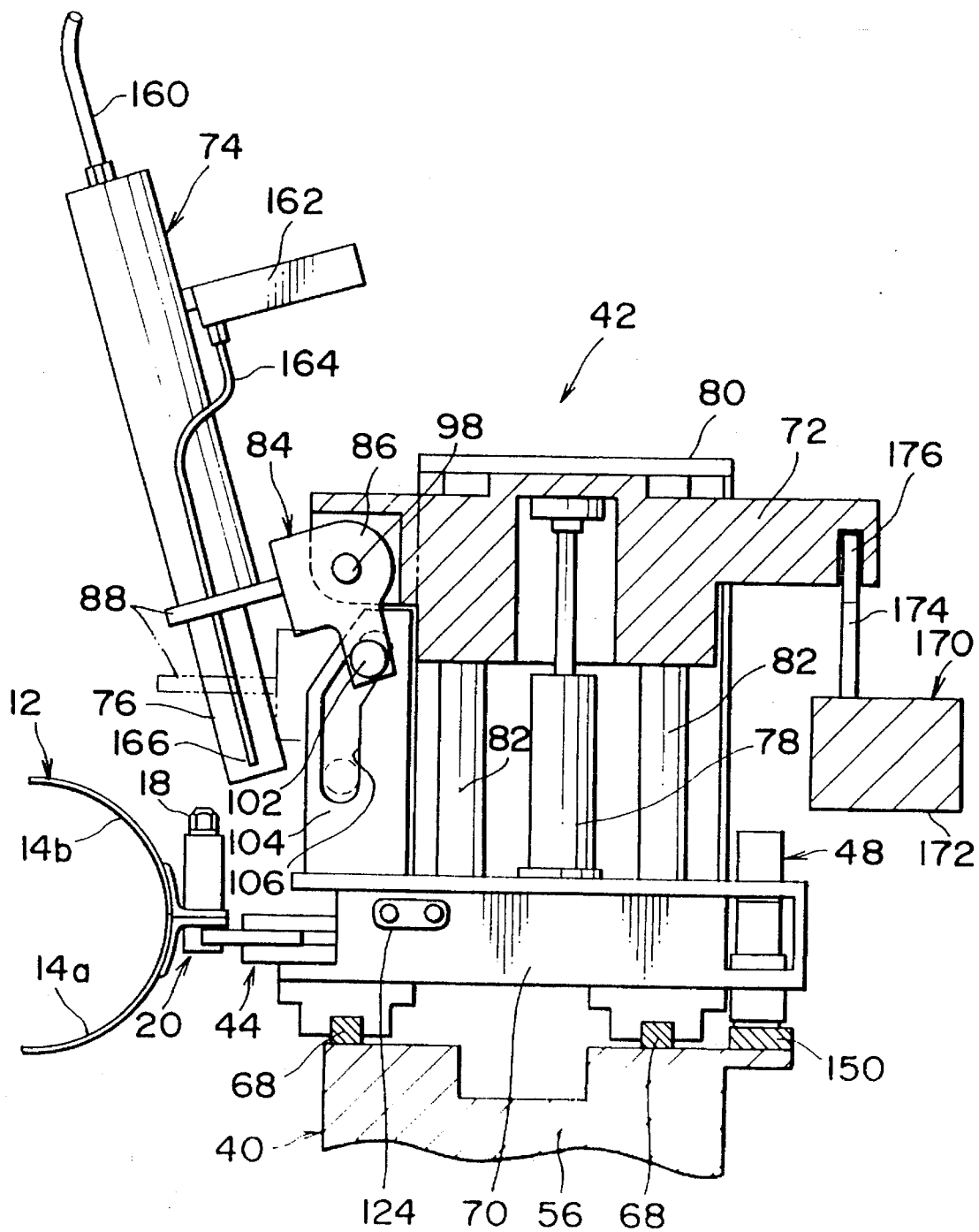
FIG. 5 is a front elevation showing one embodiment of the processing mechanism.

Referring to FIG. 5, each processing mechanism 42 is provided with: a frame, i.e., a first movable body 70 disposed on the second movable bed 56 so as to reciprocate forward and backward, led by both guide rails 68; a second movable body 72 disposed on the first movable body so as to move vertically; and a wrench 74 supported by the second movable body 72.

The wrench 74 is, in the illustrated embodiment, a wrench provided with a rotary mechanism having as its rotary source a pneumatic motor driven by compressed pressure air, and with a rotor 76 for releasably receiving a part of the screw member 18, said rotor being secured to the output shaft of the rotary mechanism. The engagement and disengagement of the rotor 76 with and from the screw member 18 can be done by vertically moving the second movable body 72 by the moving mechanism 78. The second movable body 72 and the moving mechanism 78 are enclosed by a cover 80. The rotor 75 has a hexagonal hole of approximately the same size as the head portion of the screw member 18 so as to releasably receive the head portion of the screw member.

The first movable body 70 is made of a plurality of plate members joined together in a form of a box opening to the side of the form 12. The second movable body 72 is hindered from moving in the forward and backward direction and the lateral direction by a plurality of rods 82 extending upward parallel to each other from the first movable body 70 through the second movable body 72. Each rod 82 is connected at the upper end portion with the upper wall portion of the cover 80.

The moving mechanism 78 is provided with a jack like an oil hydraulic or pneumatic cylinder mechanism and connected with the first and second movable bodies 70, 72. The moving mechanism 78 lowers to a predetermined height position the corresponding second movable body 72 and then raises the corresponding second movable body 72 to a predetermined height position while the corresponding processing mechanism 42 is moved from the first position to the second position.

The wrench 74 is supported by the second movable body 72 so as to be elastically displaceable laterally relative to the second movable body 72 by connecting means, i.e., connecting mechanism 84 for compensating a relative positional error between the screw member 18 and the wrench 74 in the lateral direction. The wrench 74 is also made to descend while rotating when the corresponding processing mechanism 42 is moved from the first position to the second position, thereby engaging with the screw member 18, tightening or loosening the screw member 18, and thereafter ascending to be away from the screw member 18.

Figure 6:
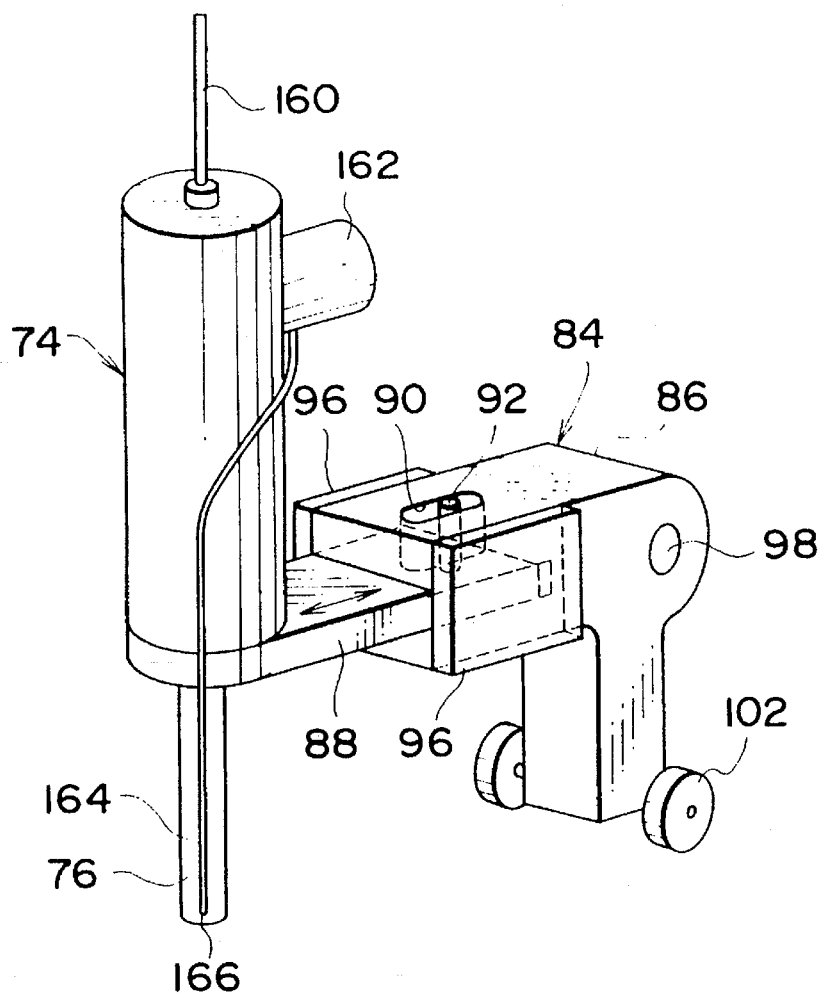
FIG. 6 is a perspective view showing one embodiment of the wrench and the connecting mechanism.
Figure 7:
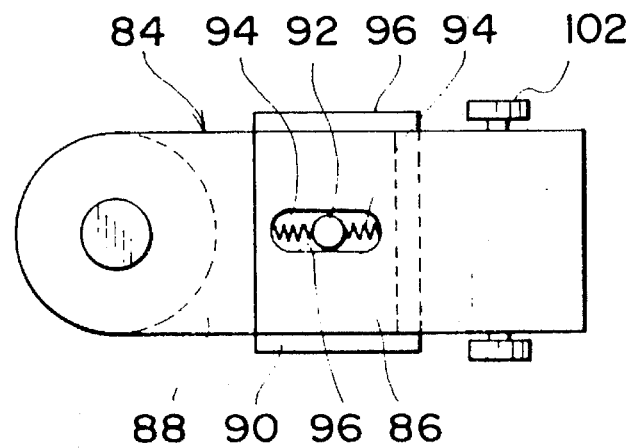
FIG. 7 is a plan view of the wrench and the connecting mechanism shown in FIG. 6.

As shown in FIGS. 6 and 7, the connecting mechanism 84 is provided with a first metal fixture, i.e., a first connector 86 having a bifurcated portion consisting of two plate-like portions spaced apart in the vertical direction, and a second metal fixture, i.e. a second connector 88 receiving in said bifurcated portion of the first connector 86 so as to be displaceable in the lateral direction. In the plate-like portion at the upper side of the first connector 88, a hole 90 penetrating vertically the plate-like portion is formed the hole 90 is elongated in the lateral direction.

To the second connector 88 is attached a connecting pin 92 extending upward from the second connector 88. The connecting pin 92 is received in the hole 90 and allowed to elastically displace in the lateral direction from a pair of elastic bodies 94 disposed in the hole 90.

As shown in FIG. B, the first connector 86 is disposed on the second movable body 72, and the second connector 88 is attached to the wrench 74, but the first and the second connectors 86, 88 may be disposed vice versa. In any case, the wrench 74 is elastically displaceable in the lateral direction relative to the second movable body 72. An oscillating movement of the wrench 74 centered about the connecting pin 92 is obstructed by a side board 96 provided at a side portion of the first connector 86.

The elastic bodies 94 are compression coil springs in the illustrated embodiment, but may be another type of elastic bodies such as rubber. In case rubber is used as elastic bodies, rubber with the connecting pin 92 may be disposed in the hole 90. The hole 90 may be circular.

The relative position of the screw member 18 and the wrench 74 in the lateral direction is more or less different depending on the position for installing the tightening/loosening apparatus 10 relative to the passage for the form, non-uniformity of dispositions of the screw member 18 in the form 12 and the like. However, even if the relative position of the screw member 18 and the wrench 74 in the lateral direction is inaccurate, the connecting mechanism 84 has a function to surely engage the wrench 74 with the screw member 18.

For example, if the position of the wrench 74 relative to the screw member 18 in the lateral direction is inaccurate, the wrench 74 contacts the head portion of the screw member 18 halfway in its movement toward the screw member. However, since the upper end portion of the head of the screw member is of a truncated conical shape, if the wrench 74 is moved further toward the screw member 18, a force to displace in the lateral direction acts on the wrench 74, whereby displacing the second connector 88 is displaced in the lateral direction against the force of the elastic bodies 94 relative to the first connector 86. As a result, the relative error in position between the screw member 18 and the wrench 74 is compensated by the connecting mechanism 84, so that the wrench 74 surely engages with the screw member 18.

While the wrench 74 is engaged with the screw member 18, the wrench 74 is maintained at the position displaced in the lateral direction relative to the second movable body 72, but is returned to its correct position relative to the second movable body 72 by the force of the elastic body 94 of the connecting mechanism 84 when the wrench 74 is separated from the screw member 18.

Referring to FIG. 5, a first connector 86 is pivotably connected with the second movable body 72 by a pivot pin 98 extending forward and backward. The first connector 86 is attached to the second movable body 72 such that the second connector 88 projects on the side of the form 12. The wrench 74 is, as shown in FIG. 8, attached to the second connector 88 such that the rotary shaft 100 extends downward through a through hole formed in the second connector 88.

Further referring to FIGS. 5 and 6, a pin 102 penetrating the first connector 86 forward and backward is rotatably attached to the first connector 86. Each end portion of the pin 102 is a roller portion received in a guide hole 106 formed in a pair of guide plates 104 of a cover 80 so as to move along the guide hole. The guide plates 104 are mounted on the upper face of the movable body 70 at intervals in the forward and backward direction and extend upwards parallel to each other to face each other.

Each guide hole 106 has a first part extending from a lower portion to an upper portion, and a second part gradually receding from the upper end of said first part to the side opposite to the form 12. As a result, while the pin 102 moves in the first part of the guide hole 106, the second connector 88 is maintained at a position, as shown in FIGS. 2 and 8, such that the axis of rotation of the wrench 74 and the rotor 75 extends in the vertical direction, and that the rotor 76 faces the passage for the screw member 18 in the lateral direction. While the pin 102 moves in the second part of the guide hole 106, however, the second connector 88 is inclined such that, as shown in FIG. 5, the rotor 76 retreats from the passage for the screw member 18.

Figure 8:
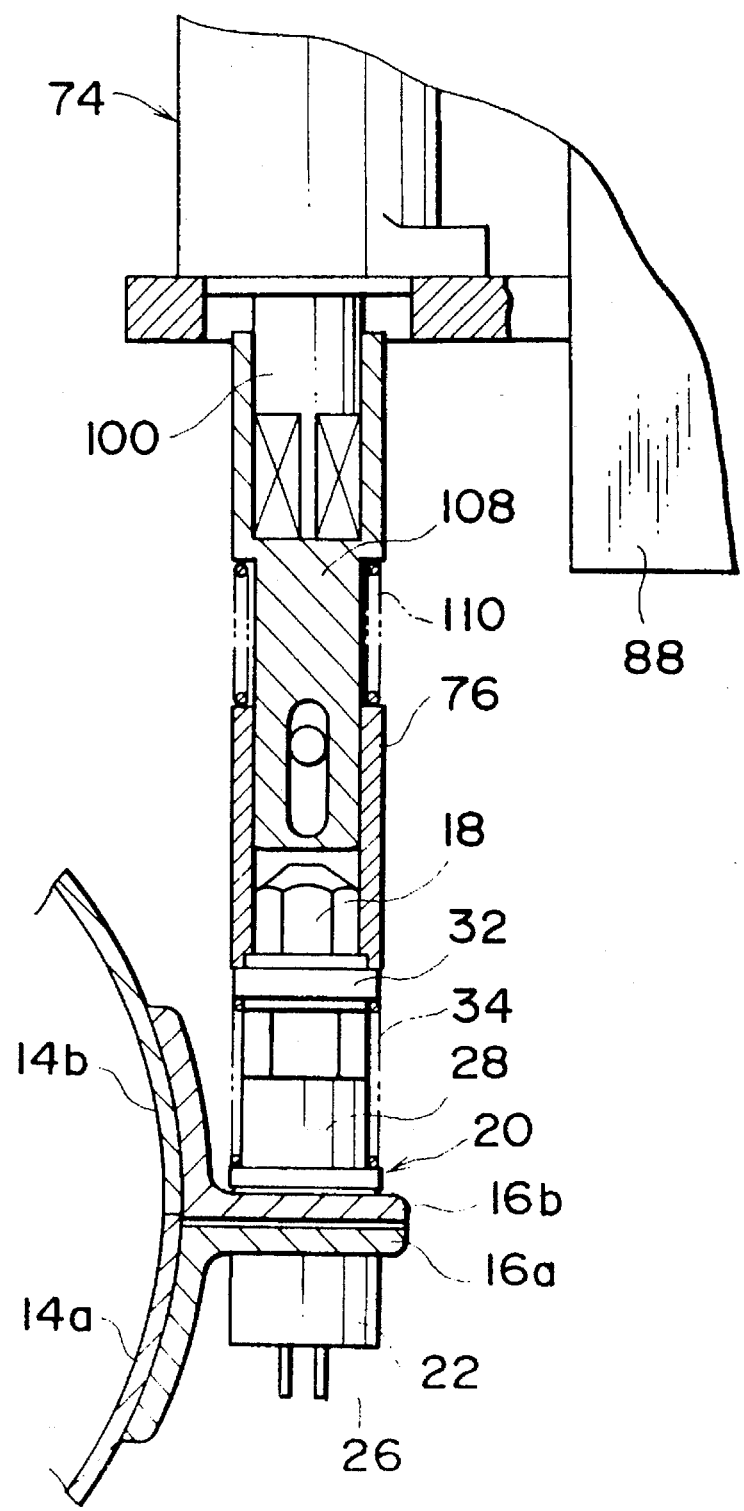
FIG. 8 is a sectional view showing one embodiment of the rotor.

Referring to FIG. 8, the rotor 76 has a hexagon tubular shape for receiving the head portion of the screw member 18 irrotatably. The rotor 76 is supported by an auxiliary member 108 irrotatably about its axis and movably in the vertical direction and is energized downward by a spring 110. The auxiliary member 108 is mounted on the rotary shaft 100 of the wrench 74 so as to extend further downward from the rotary shaft.

Referring to FIG. 9, each engaging mechanism 44 includes an engaging piece 112. The engaging piece 112 is mounted on the first movable body 70 of the processing mechanism 42 in the end portion opposite to the engaging portion 112a by a vertically extending pin 114 so that the engaging portion 112a can enter and go out of the passage for the form. The engaging piece 112 is pivotably connected to one end of the link piece 116. The other end of the link piece 116 is pivotably connected to one end of a link piece 118. The link piece 118 is pivotably attached to the first movable body 70 by a vertically extending pin 120 and rotated angularly around the pin 120 by the drive mechanism 122.

The drive mechanism 122 is, in the illustrated example, an oil hydraulic or pneumatic cylinder mechanism. The cylinder of this cylinder mechanism is connected to the first movable body 70, while the piston rod is connected to the link piece 118. When the drive mechanism 122 is extended, the link pieces 116, 118 are extended, whereby the engaging portion 112a of the engaging piece 112 is projected into the passage for the form. On the other hand, when the drive mechanism 122 is contracted, the link pieces 116, 118 are bent, whereby the engaging portion 112a of the engaging piece 112 is retreated from the passage for the form.

The engaging portion 112a of the engaging piece 112 is engaged with a predetermined portion of the form in a state of projecting into the passage for the form, whereby the engaging mechanism 46 is advanced with the form, and the processing mechanism 42 is also advanced with the form. The portion engageable with the engaging portion 112a can be a projecting portion in the form 12, the screw member 18 itself, the fastening apparatus 20 in FIG. 4 or the like.

In the embodiment shown in FIG. 9, the engaging portion 112a engages with a holding member 22 of the fastening apparatus 20. However, as for the position where the engaging portion 112a engages, any portion having a certain positional relation with the screw member 18 will do, so a portion to be engaged with the engaging portion 112a may be formed in the form.

Also, it is possible to make the engaging mechanism 44 such that the engaging portion 112a is projected into the passage for the form when the link pieces 116, 118 are bent and that the engaging portion 112a is retreated from the passage for the form when the link pieces 116, 118 are extended.

Each engaging mechanism 44 is further provided at the first movable body 70 of the processing mechanism 42 with a pair of slide shafts 124 disposed reciprocally in the forward and backward direction. Both slide shafts 124 are connected at their front ends and at their rear ends respectively by connecting members 126, 128. Both slide shafts 124 are energized by a spring 130 such that their major parts are projected forward from the first movable body 70.

The connecting member 128 is engaged with the link piece 118 so as to forcibly bend the link pieces 116, 118, when the major parts of both slide shafts 124 are retreated into the first movable body 70, by pushing the link piece 118 rearward. As a result, when the major parts of the slide shafts 124 are retreated into the first movable body 70, both link pieces 116, 118 are pushed by the connecting member 128 to bend, whereby the engaging portion 112a is forced to retreat from the passage for the form.

Further referring to FIGS. 1–3, a returning mechanism 46 is provided with a slider 132 disposed on a second movable bed 56 so as to reciprocate forward and backward, guided by both guide rails 68, and a drive mechanism 134 for forcibly moving the slider 132 forward and backward. The slider 132 is disposed in front of the frontmost processing mechanism 42 so as to contact the connecting member 126 (see FIG. 9) disposed in the processing mechanism 42 in the frontmost position.

The drive mechanism 134 is provided with an oil hydraulic of pneumatic pressure cylinder mechanism. The slider 132 is moved forward when the drive mechanism 134 is extended, and moved rearward when the drive mechanism 134 is contracted. The slider 132 has a contact portion 136 to contact the frontmost processing mechanism 42 when the slider 132 is moved backward. Therefore, when the drive mechanism 134 is contracted, the slider 132 is moved backward to move the frontmost processing mechanism 42 backward, so that the processing mechanisms 42 contact the following processing mechanism successively, whereby all the processing mechanisms 42 are simultaneously moved backward.

Figure 10:
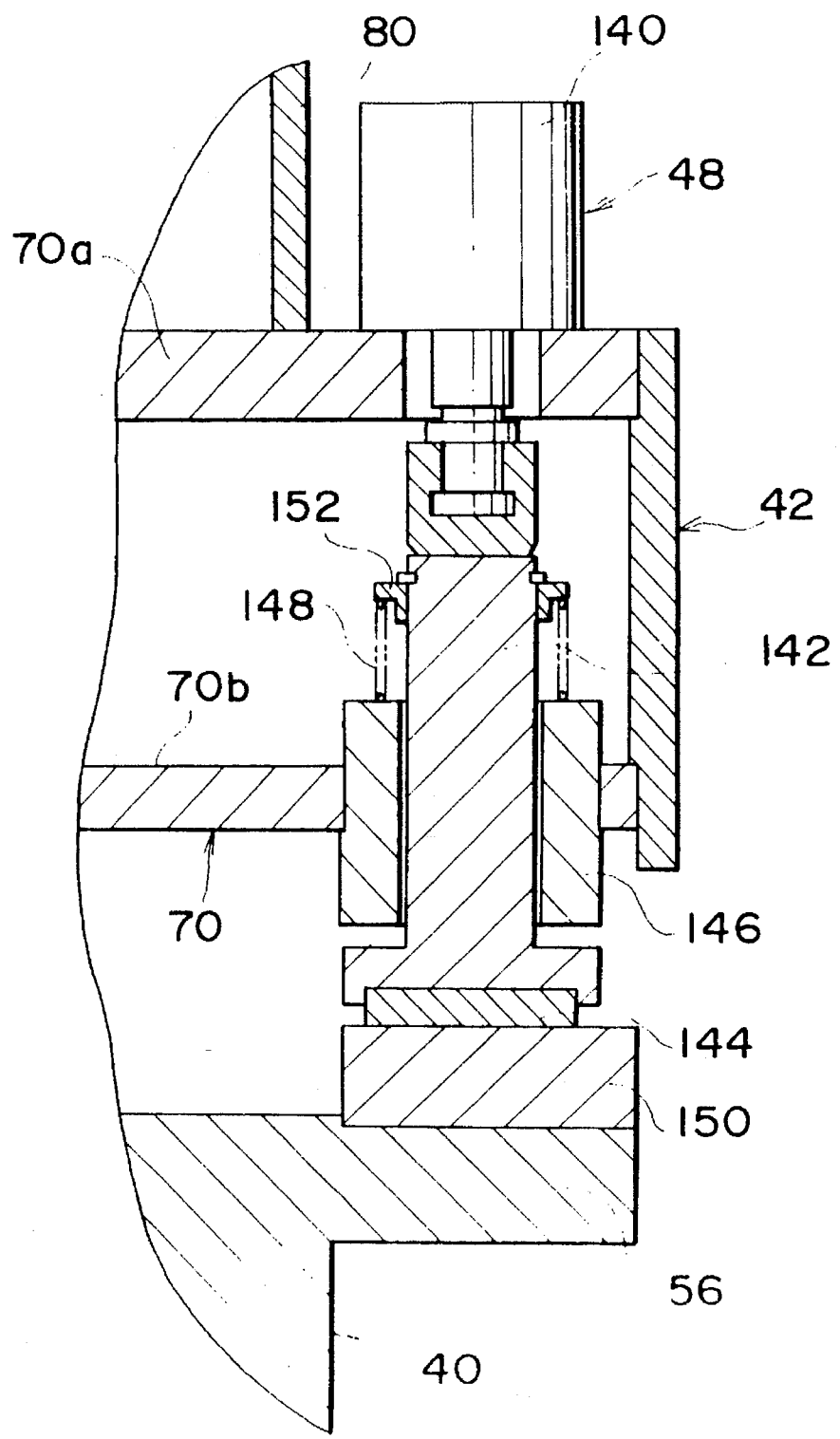
FIG. 10 is a sectional view showing one embodiment of the control mechanism.

Referring to FIG. 10, a braking mechanism 48 is provided with a drive mechanism 140, a rod-like pusher 142 to be moved vertically by the drive mechanism, and a brake pad 144 mounted on the lower face of the pusher. The drive mechanism 140 is an extending and contracting mechanism using an oil hydraulic cylinder, a pneumatic pressure cylinder mechanism, solenoid mechanism, etc., and is mounted on the upper wall portion 70a on the first movable body 70 such that the extending and contracting direction is vertical. The pusher 142 slidably passes through a collar 146 mounted on the lower wall portion 70b of the first movable body 70, and is connected at its upper end to the drive shaft of the drive mechanism 140.

The pusher 142 is ordinarily displaced upward by a spring 148. However, when a corresponding processing mechanism 42 is stopped, the pusher 142 is pushed downward by the drive mechanism 140, whereby the brake pad 144 is pressed against rails 150 for braking mounted on the first movable bed 56. To the pusher 142 is attached a ring 152 for applying the force of the spring 148 to the pusher 142.

Referring to FIGS. 1–3, the tightening/loosening apparatus 10 further includes a plurality of buffers 154 mounted on the slider 132 of the returning mechanism 46 so that the front face of the frontmost processing mechanism 42 can contact the buffers 154 when the frontmost processing mechanism 42 is moved to the second position; and a plurality of buffers 156 mounted on the second movable bed 56 so that the rear face of the rearmost processing mechanism 42 can contact the buffers 156 when the rearmost processing mechanism 42 is moved to the first position. The buffers 156 are mounted on the second movable bed 56 by an adapter plate 158.

The buffers 154, 156 are provided for reducing impacts and noises caused by the processing mechanisms. Therefore, the buffers 154 and 156 may be provided in the frontmost and rearmost processing mechanisms 42 respectively. Also, depending on the shapes of the second movable bed 56 and the returning mechanism 46, the buffers 154 may be provided on the second movable bed 56, or the buffers 156 may be provided on the returning mechanism 46. Further, a similar buffer may be provided in one of adjacent processing mechanisms 42 so as to contact the other of the adjacent processing mechanisms 42 when the adjacent processing mechanisms approach each other.

As shown in FIGS. 2, 5 and 6, the pneumatic motor of the wrench 74 is rotated by the pressure air such as the compressed air fed from the hose 160. Most of the pressure air exhausted from the pneumatic motor is released in the atmosphere from attachments 162 to a muffler or the like mounted on the wrench 76.

A part of the air exhausted from the pneumatic motor is, however, fed to a small pipe 164 extending to the lower end of the rotor 76 along the sides of the wrench 76 and the rotor 76. The pipe 164 is supported by the wrench 76 so as to eject a part of the air exhausted from the pneumatic motor toward the passage for the screw member 18 from above.

The pressure air for the pneumatic motor generally contains a very small amount of oil ingredients, which also remains in the air exhausted from the pneumatic motor. Therefore, the screw member 18 is sprayed air containing oil ingredients widen it moves at the lower end of the pipe 164 of the wrench 76 in operation, that is, below the nozzle portion 166, so that it naturally undergoes oil dissemination.

As shown in FIGS. 1, 2, 3 and 5, the tightening/loosening apparatus 10 further includes a plurality of displacing mechanisms 170 for forcibly displacing the wrench 42 in a direction to be away from the screw member 18 when the wrench 42 is moved to the vicinity of the second position in a state of the wrench 74 being engaged with the screw member 18.

Every processing mechanism 42 is provided with a displacing mechanism 170. Each displacing mechanism 170 has a long cam base 172 mounted on the support means 40, a first cam member 174 mounted on the cam base, and a second cam member 176 disposed on the processing mechanism 42.

The cam base 172 is mounted on the second movable bed 56 and extends in the moving direction of the form 12 under the opposite side of the wrench 74 to a cover 80 of the processing mechanism 42.

First cam members 174 are plate-like members having an inclined cam face, and are spaced apart in the lateral direction at a portion corresponding to the second position such that the cam faces come rearward in the moving direction of the form 12. The second position is different depending on the processing mechanism. Therefore, the first cam members 174 are disposed one after another in the moving direction of the form 12.

Each second cam member 176 is a roller-like member and is rotatably supported by the second movable body 72 of the corresponding processing mechanism 42. A part of each second cam member 176 is projected downward from said end portion. The position of each second cam member 176 in the lateral direction is the same as that of the corresponding first cam member 174.

If the wrench 74 of the processing mechanism 42 is elevated to a position where it does not engage with the screw member, the height position of the second cam members 176 is on a level where it does not get into contact with the first cam member 174. However, if the wrench 174 of the processing mechanism 42 is lowered to a position engageable with the screw member 18, the height positions of the second cam members 176 are on a level where it contacts the cam face of the first cam member 174 when the processing mechanism 42 is advanced to the vicinity of the second position.

When the wrench 74 is engaged with the screw member 18 though the processing mechanism 42 is moved to the vicinity of the second position, the second cam members 175 get into contact with the cam faces of the first cam members 174, and the second cam members 176 are pushed up by the cam faces of the first cam members 174 following the advancement of the processing mechanism 42, whereby the displacing mechanism 170 forcibly elevates the second movable body 72 of the processing mechanism 42, thus elevating the wrench 74 forcibly and releasing the wrench 74 from the screw member. Consequently, even if the moving mechanism 78 or the like gets out of order, it is safe because the wrench 74 comes off the screw member 18 at a predetermined position.

Instead of mounting the first cam members 174 on the cam base 170 and disposing the second cam members 175 in the second movable body 72, the first cam members 174 may be mounted on the second movable body 72 and the second cam members 176 on the cam base 170. Also, a cam member of other shape than the above-mentioned may be used.

When waiting, each processing mechanism 42 is retreated to a first position shown in FIG. 1, and a slider 132 of the returning mechanism 46 is moved to the front position. Further, the second movable body 72 of each processing mechanism 42 is elevated, so that the second cam member 176 of the displacing mechanism 170 is also elevated. In this state, the tightening/loosening apparatus 10 is controlled by a control device not shown.

With the movement of the form 12, when the first screw member 18 arrives at a predetermined position, a drive mechanism 122 of the engaging mechanism 44 corresponding to the frontmost processing mechanism, i.e. the first processing mechanism 42 is firstly driven. Thereby, the engaging portion 112a of the engaging piece 122 of the engaging mechanism 44 is projected into the passage for the form 12 and engages with a predetermined position of the form 12, the first processing mechanism, 12 is advanced with the movement of the form 12 in a state of being positioned relative to the screw member 18 by the engaging mechanism 44.

Meanwhile, when the second screw member 18 arrives at a predetermined position, the drive mechanism 122 of the engaging mechanism 44 corresponding to the second processing mechanism 42 is driven, the second processing mechanism 42 is moved like the first processing mechanism 42 with the movement of the form 12. Likewise, every time a screw member arrives at a predetermined position, the processing mechanism 42 is advanced with the movement of the form 12.

It is sensed by, for example, a sensor provided for each processing mechanism 42 that the screw member 18 has arrived at a predetermined position. As a sensor, a reed switch, a contactless switch, a photo sensor or the like can be used. The height position of the portions to be sensed of the form 12 has preferably a different value for each machine.

While each processing mechanism 42 moves from the first position to the second position, the rotor 76 is rotated by the wrench 74, and simultaneously the second movable body 72 is lowered by the movable body 78, thereby tightening or loosening the screw member 18, the rotation of the rotor 76 is stopped, and then the second movable body 72 is elevated. Thereafter, the second movable body 72 and the rotor 76 are returned to their initial positions.

As already mentioned, when the rotor 76 engages with the screw member 18, a relative difference in position between the screw member 18 and the wrench 74 in the lateral direction is compensated by the connecting mechanism 84, and the wrench 74 surely engages with the screw member 18. Further, when the screw member 18 is moved below the nozzle portion 166 of the pipe 164 of the wrench 74 in operation, the screw member 18 is sprayed part of the air exhausted from the pneumatic motor and undergoes the dispersion of the oil contained in the air.

When each processing mechanism 42 arrives at the vicinity of the second position, the drive mechanism 140 of the control mechanism 48 is driven after the engaging portion 112a of the engaging mechanism 44 is retreated from the passage for the form, whereby each processing mechanism 42 stops at the second position. The engaging portion 112a is retreated from the passage for the form by the drive mechanism 122. However, even if the engaging portion 112a is not retreated from the passage for the form, slide shafts 124 are retreated by the contact portion 136 of a slider 132 or a preceding processing mechanism 42. Consequently, the contact portion 112a is surely retreated from the passage for the form 12.

When the processing mechanism 74 is advanced, the wrench 74 is to be released from the screw member 18 by the moving mechanism 78 normally by the time the processing mechanism 42 arrives the vicinity of the second position. However, if the wrench 74 is engaged with the screw member 18 though the processing mechanism 74 has been moved to the vicinity of the second position, the wrench 74 is forced to elevate by a cooperative action of the first and the second cam members 174, 176 of the displacing mechanism 170, and the wrench 74 is forcibly disengaged from the screw member.

When all the processing mechanisms 42 are moved to the second position, the drive mechanism 134 of the returning mechanism 46 is contracted, whereby all the processing mechanisms 42 are collectively returned to the first position. Each processing mechanism 42, even when being returned to the first position, is smoothly stopped by a braking mechanism 48.

The above-mentioned process is repeated until the end of tightening or loosening of all the screw members 18.

According to the tightening/loosening apparatus 10, the screw members 18 can be tightened or loosened by reciprocating a plurality of the processing mechanisms 42. As a result, a large space for installation is not required, and there is no fear that an electric lead line for the power or a hose for compressed air for the processing mechanisms 42 gets twisted, so that the apparatus can be miniaturized and simplified. Also, since the engaging mechanism 44 is engaged with the form 12, thereby advancing the processing mechanisms 42 as they are positioned relative to the screw members 18, the moving state of the processing mechanisms 42 varies with a location pitch of the screw members 18, a change in the moving speed of the form 12 or the like. Therefore, the apparatus can be used in various forms different in the location pitch of the screw members, the moving speed of the forms or the like, in common.

It is preferable, while the tightening/loosening apparatus 10 is operating, to detect the pressure of the pressure air, to sense any abnormality of the like in the pneumatic motor from a change of detected value, i.e. the difference between pressure values, and to inform each wrench by an indicator, a buzzer of the like that the screw members and the wrench are abnormal.

In case the tightening/loosening apparatus is applied to a tightening apparatus for example, when tightening of the screw members to a predetermined state is completed, the pressure of the air to be fed to the pneumatic motor is increased to a predetermined value, an abnormality in the screw members and the wrench can be sensed because no increase in the pressure increase is caused by the tightening operation during a predetermined period of time.

Also, in case the tightening/loosening apparatus is applied to a loosening apparatus, when the loosening is completed, the pressure of the air fed to the pneumatic motor is decreased to a predetermined value. So, an abnormality can be sensed because no predetermined decrease of the pressure is caused despite the loosening.

The wrench 74 may be a kind of wrench having an oil hydraulic motor or the like as its rotary mechanism. Like the tightening/loosening apparatus if the rotor 76 Of the processing mechanism 42 is rotated by a wrench having a rotary mechanism like a pneumatic motor, the impact, the vibration and the noise are smaller in comparison with a case where a wrench generating a rotational force by impact such as an impact wrench is used, while a wrench generating a rotational force by shock such as an impact wrench may be used in the present invention.

In order to insure an engagement of the head portion of the screw member 18 with the rotor 76 of the wrench 74 and to compensate a relative gap in positions between the head portion of the screw member 18 and the rotor 76 of the wrench 74 in the lateral direction by the connection mechanism 84, the top end of the head portion of the screw member may be formed, as shown in the illustrated embodiment, into such shapes as truncated cone, truncated hexagon, cone, hemisphere or the like, and the screw member receiving portion of the rotor 76 of the wrench 74 may be formed into such shapes as truncated hexagon, truncated cone, hemisphere or the like.

Also, instead of engaging the rotor 76 of the wrench 74 with the head portion of a bolt, the rotor 76 may be engaged with a nut to be screwed on the bolt. The configuration of the engaging portion of the rotor of the wrench with the screw member can be square, octagonal, or of other shapes whether the screw member is a bolt or a nut. Further, instead of receiving the screw member in the wrench, the wrench may be inserted into a recess formed in the screw member.

The present invention can be applied to any of dedicated devices for tightening or loosening, and to a common device for tightening and loosening. The direction of rotation of the rotor 75 is different, depending on whether the tightening/loosening apparatus 10 is intended for tightening or loosening. It is also different depending on whether the screw member 18 is a right-handed screw or left-handed screw.

The present invention can be applied not only to an apparatus for reciprocating the processing mechanism but also to an apparatus for circulating the processing mechanism like a closed loop, such as a known apparatus described in the Official Gazette of Japanese Patent Appln. Publication No. 59-49159, and can be applied not only to an apparatus provided with a plurality of processing mechanisms but also to an apparatus provided with a single processing mechanism. Further, it is applied not only to an apparatus for vertically moving the wrench when engaging the wrench with the screw member, but also to an apparatus for moving the wrench in the lateral direction, an apparatus for moving the wrench in the lateral direction, an apparatus for moving the wrench in the diagonal direction.

What is claimed is:

1. An apparatus for tightening/loosening a screw member for fastening a form, the screw member being disposed on the form, comprising:

at least one processing mechanism provided with a wrench releasably engaged with said screw member to rotate said screw member about its axis, said processing mechanism being moved with said form from a first position rear in a moving direction of said form to a second position ahead in the moving direction of said form;

a moving mechanism for moving said wrench toward said screw member so as to be engaged therewith and also for moving said wrench to be away from said screw member so as to be disengaged from said screw member, while said processing mechanism is moved from said first position to said second position; and a displacing mechanism for forcibly displacing said wrench to disengage it from said screw member by the aid of the movement of said processing mechanism when said wrench, in a state of engagement with said screw member, is moved to the vicinity of said second position.

2. An apparatus according to claim 1, further comprising: a support means for supporting said processing mechanism movably in the moving direction of said form; and an engaging mechanism disposed on said processing mechanism to releasably engage with said form and to advance said processing mechanism upon receipt of a moving force from said form while engaged with said form.

3. An apparatus according to claim 2, wherein said displacing mechanism includes a first cam member disposed on said support means at a position corresponding to said second position in the moving direction of said form; and a second cam member disposed on said processing mechanism so as to contact said first cam member when said processing mechanism is moved to the vicinity of said second position and to displace said wrench in a direction to be away from said screw member.

4. An apparatus according to claim 3, wherein said processing mechanism further includes a first movable body disposed on said support means so as to move reciprocally in the moving direction of said form, and a second movable body disposed on said first movable body so as to move vertically, said second movable body supporting said wrench; wherein said second movable body is vertically moved by said moving mechanism, so that said wrench may be engaged with and disengaged from said screw member; and wherein said second cam member is disposed in said second movable body.

5. An apparatus according to claim 1, wherein a plurality of said processing mechanisms are arranged one after another so as to move reciprocally between said first and said second positions with the movement of said form; and wherein each processing mechanism is provided with said moving mechanism and said displacing mechanism.

6. An apparatus according to claim 1, wherein said wrench has as its source of rotation a pneumatic motor to be rotated by pressure air; and wherein said processing mechanism further includes a nozzle portion for ejecting toward a passage for said screw member a part of the air exhausted from said pneumatic motor.

7. An apparatus according to claim 1, wherein said processing mechanism further includes: a first movable body disposed on a support means so as to be moved in the moving direction of said form; a second movable body disposed on said first movable body so as to be moved vertically; and connecting means for connecting said wrench with said second movable body so that said wrench may be displaced elastically in the horizontal direction across the moving direction of said form.

8. An apparatus according to claim 7, wherein said connecting means includes: a first connector having a vertical through hole and disposed on one of said second movable body and said wrench; a second connector disposed on the other of said second movable body and said wrench, said second connector being received by said first connector so as to be displaced horizontally across the moving direction of said form; a connecting pin attached to said second connector and received by said hole; and an elastic body allowing said connecting pin to displace elastically in the horizontal direction across the moving direction of said form relative to said hole.

9. An apparatus according to claim 1, wherein said wrench includes: a rotating mechanism; a rotor releasably engaged with said screw member, said rotor being supported and rotated by said rotating mechanism so as to rotate said screw member about its axis; and a spring for applying a force to said rotor for displacing said rotor downward.

10. An apparatus according to claim 1, wherein said screw member includes: a polygonal columnar portion; and an end portion shaped like a polygonal pyramid or a truncated pyramid and integral with said columnar portion, said end portion being tapered away from said columnar portion; and wherein said wrench includes a recess shaped like a polygonal cross section in correspondence to the columnar portion of said screw member so as to receive said columnar portion of said screw member.

* * * * *

UNITED STATES PATENT AND TRADEMARK OFFICE
CERTIFICATE OF CORRECTION

PATENT NO. : 5,515,752
DATED : May 14, 1996
INVENTOR(S) : Takayasu Sawano and Kazuo Nakada It is certified that error appears in the above-indentified patent and that said Letters Patent is hereby corrected as shown below:

Title page, item '[54]', "TIGHTENING LOOSENING" should read --TIGHTENING/LOOSENING--.

Title page, item '[56] References Cited, U.S. PATENT DOCUMENTS', insert:
--4,953,580   9/1990   Schabert et al. .
  5,125,298   6/1992   Smith .--.

Title page, item '[56] References Cited, FOREIGN PATENT DOCUMENTS', insert --3723386   1/1989   Germany .--.

Title page, item '[56] References Cited', after FOREIGN PATENT DOCUMENTS information, insert:
--OTHER PUBLICATIONS
Prospectus of DEPRAG Schulz GmbH & Co., Amberg, "DEPRAG Schraubstationen in Ultra-Schraubtechnik", January 19, 1993, pp. 1-15.
Milberg, D., "Im Gleichschritt marsch; Neue Sensorschnittstelle für förderbandsynchrone Montage", Journal ROBOTER, May 1992, pp. 34-36.--.

Column 1 Line 1 "TIGHTENING LOOSENING" should read --TIGHTENING/LOOSENING--.

Column 4 Line 44 before "semicircular" delete "a".

Column 6 Line 4 "5B" should read --58--.

Column 6 Line 13 "sn" should read --on--.

UNITED STATES PATENT AND TRADEMARK OFFICE
CERTIFICATE OF CORRECTION

PATENT NO. : 5,515,752
DATED : May 14, 1996
INVENTOR(S) : Takayasu Sawano and Kazuo Nakada It is certified that error appears in the above-indentified patent and that said Letters Patent is hereby corrected as shown below:

Column 6 Line 50 "rotor 75" should read --rotor 76--.

Column 7 Line 23 "88," should read --86,--.

Column 7 Line 31 "B," should read --5,--.

Column 8 Line 37 "75" should read --76--.

Column 10 Line 50 "wrench 76." should read --wrench 74.--.

Column 10 Line 53 "wrench 76" should read --wrench 74--.

Column 10 Line 54 "wrench 76" should read --wrench 74--.

Column 10 Line 61 "widen" should read --when--.

Column 10 Line 62 "wrench 76" should read --wrench 74--.

Column 10 Line 66 "wrench 42" should read --wrench 74--.

Column 11 Line 1 "wrench 42" should read --wrench 74--.

Column 11 Line 33 "wrench 174" should read --wrench 74--.

Column 11 Line 42 "175" should read --176--.

Column 11 Line 56 "175" should read --176--.

Column 12 Line 11 "mechanism, 12" should read --mechanism 42--.

UNITED STATES PATENT AND TRADEMARK OFFICE
CERTIFICATE OF CORRECTION

PATENT NO. : 5,515,752
DATED : May 14, 1996
INVENTOR(S) : Takayasu Sawano and Kazuo Nakada It is certified that error appears in the above-indentified patent and that said Letters Patent is hereby corrected as shown below:

Column 12 Line 63 "mechanism 74" should read --mechanism 42--.

Column 12 Line 66 after "arrives" insert --at--.

Column 13 Line 1 "mechanism 74" should read --mechanism 42--.

Column 13 Line 34 "of the" should read --or the--.

Column 13 Line 37 "of the" should read --or the--.

Column 13 Line 56 after "apparatus" insert --10,--.

Column 13 Line 56 "Of" should read --of--.

Column 14 Line 20 "75" should read --76--.

Column 14 Line 28 "59-49159," should read --59-49169,--.

Signed and Sealed this

Third Day of September, 1996

Attest:

BRUCE LEHMAN

*Attesting Officer*   *Commissioner of Patents and Trademarks*